(12) United States Patent
Kolbjørnsen et al.

(10) Patent No.: US 9,069,100 B2
(45) Date of Patent: Jun. 30, 2015

(54) METHOD OF MODELLING A SUBTERRANEAN REGION OF THE EARTH BY PERFORMING A BAYESIAN INVERSION

(75) Inventors: Odd Kolbjørnsen, Tranby (NO); Ragnar Hauge, Oslo (NO); Arild Buland, Sandnes (NO)

(73) Assignee: STATOIL PETROLEUM AS, Stavanger (NO)

( * ) Notice: Subject to any disclaimer, the term of this patent is extended or adjusted under 35 U.S.C. 154(b) by 365 days.

(21) Appl. No.: 13/061,803

(22) PCT Filed: Sep. 3, 2009

(86) PCT No.: PCT/EP2009/061420
§ 371 (c)(1),
(2), (4) Date: Mar. 28, 2011

(87) PCT Pub. No.: WO2010/026198
PCT Pub. Date: Mar. 11, 2010

(65) Prior Publication Data
US 2011/0172977 A1    Jul. 14, 2011

(30) Foreign Application Priority Data
Sep. 3, 2008    (GB) .................................. 0816041.8

(51) Int. Cl.
*G06F 7/60*    (2006.01)
*G06G 7/48*    (2006.01)
*G01V 11/00*    (2006.01)

(52) U.S. Cl.
CPC .......... *G01V 11/00* (2013.01); *G01V 2210/661* (2013.01); *G01V 2210/6224* (2013.01); *G01V 2210/665* (2013.01)

(58) Field of Classification Search
None
See application file for complete search history.

(56) References Cited

U.S. PATENT DOCUMENTS

| | | | |
|---|---|---|---|
| 5,416,750 A | 5/1995 | Doyen et al. | |
| 5,764,515 A | 6/1998 | Guerillot et al. | |
| 5,838,634 A * | 11/1998 | Jones et al. | 367/73 |
| 5,995,906 A | 11/1999 | Doyen et al. | |
| 7,743,006 B2 * | 6/2010 | Woronow et al. | 706/17 |

(Continued)

FOREIGN PATENT DOCUMENTS

GB    2 409 900 A    7/2005

OTHER PUBLICATIONS

Avseth et al., "Seismic reservoir mapping from 3-D AVO in a North Sea turbidite system", Geophysics, vol. 66, No. 4, Jul.-Aug. 2001, pp. 1157-1176, XP-002519932.

(Continued)

*Primary Examiner* — Omar Fernandez Rivas
*Assistant Examiner* — Nithya J Moll
(74) *Attorney, Agent, or Firm* — Birch, Stewart, Kolasch & Birch, LLP

(57) ABSTRACT

A method of modelling a subterranean region of the Earth at a first location comprises the steps of: providing geological data; selecting a plurality of facies; providing a distribution of rock physics probability with spatial dependencies; approximating the rock physics probability at the first location with at least one distribution per facies utilizing the spatial dependencies in the rock physics probability distribution; and performing a Bayesian inversion at the first location using the approximation of the rock physics probability distribution. The method may also employ a window comprising the first location and at least one further location.

34 Claims, 13 Drawing Sheets

(56) References Cited

U.S. PATENT DOCUMENTS

| | | | | |
|---|---|---|---|---|
| 8,086,426 B2* | 12/2011 | El Ouair et al. | ............... | 703/2 |
| 2008/0195358 A1* | 8/2008 | El Ouair et al. | ............... | 703/2 |
| 2009/0164186 A1* | 6/2009 | Haase et al. | ............... | 703/10 |

OTHER PUBLICATIONS

Buland et al., "Bayesian linearized AVO inversion", Geophysics, vol. 68, No. 1, Jan.-Feb. 2003, pp. 185-198, XP-002558887.

Buland et al., "Bayesian lithology and fluid prediction from seismic prestack data", Geophysics, vol. 73, No. 3, May-Jun. 2008, pp. C13-C21.

Eidsvik et al., "Stochastic reservoir characterization using prestack seismic data", Geophysics, vol. 69, No. 4, Jul.-Aug. 2004, pp. 978-993, XP-002313759.

Larsen et al., "Bayesian lithology/fluid prediction and simulation on the basis of a Markov-chain prior model", Geophysics, vol. 71, No. 5, Sep.-Oct. 2006, pp. R69-R78, XP-002558888.

* cited by examiner

☐ Shale  ☒ Brine sand  ◪ HC sand

METHOD OF MODELLING A SUBTERRANEAN REGION OF THE EARTH BY PERFORMING A BAYESIAN INVERSION

The present invention relates to a method of modelling a subterranean region of the Earth. For example, the method may be used to model and predict the probability of a type of lithology and pore fluid combination present at a location during exploration of a region below a surface of the Earth.

There are various known techniques for identifying lithology and fluids. Early methods for direct hydrocarbon identification (DHI) and lithology and fluid prediction (LFP) were qualitative in the form of different seismic attributes. These attributes were constructed to visually highlight specific rock properties and lithology and fluid types. An important class of methods is amplitude versus offset (AVO) methods. AVO is directly related to the reflection coefficient at the boundary between rocks of different types and properties or different pore fluids.

Seismic inversion is here defined as a quantitative transform of the seismic amplitudes to the elastic properties of the subsurface. The elastic properties, for example bulk and shear modulus and density, or VP, VS and density, can be regarded as layer properties.

We here define a facies to be a layer of a single composition with specified elastic properties. Facies may comprise rock or porous rock or a porous rock containing fluid. For example a facies may be shale, oil filled sandstone or brine filled sandstone. The elastic properties for a facies can be obtained from well logs or rock models. A facies will typically have varying elastic properties due to natural variation and uncertainty. The varying elastic properties may be represented by samples (from well log measurements or rock model simulations) or by probability density functions (PDF).

In standard facies identification, mapping rules from elastic properties to facies classes are established and applied to the inversion results. The simplest methods define classification rules. More advanced schemes calculate facies probabilities based on rock property PDFs. Usually, the uncertainty of the seismic inversion is not computed and included in the analysis.

The standard mapping from an inversion result to facies probabilities (or facies classification) is local or point-wise. For example, the inversion result in a specific location (cell or sample) is mapped to fades without considering the surrounding locations. The known local mapping methods are suboptimal with respect to facies prediction. A possible disadvantage is that location-wise or point-wise methods may give high probability for brine (high density) above gas (low density) since there are no spatial relationships involved in the mapping.

The seismic time-angle gather at a specific lateral location, denoted d, is assumed to be the response of an elastic vertical profile with elastic properties m. For isotropic materials, the relevant seismic properties are two elastic parameters and density, for example the P-wave velocity, the S-wave velocity, and the density. Hereafter we will denote these three parameters as elastic parameters. The elastic parameters define the seismic reflection coefficients and the amplitudes of the seismic data depending on the reflection angle. In an isotropic medium, the number of elastic parameters is 3, such that the vector m of elastic parameters has dimension 3L with L being the number of discrete time samples in a vertical profile. A regular sampling corresponding to the sampling of the seismic data is a natural choice, but this is not required. The vertical earth profile is also characterized by a vector of categorical facies classes f, usually defined as lithology-fluid classes. Inferences may be made about facies profile f based on the seismic data d. In Bayesian inversion, all inferences are completely based on the posterior distribution. The posterior distribution for the fades vector f given the seismic gather d is given by the standard Bayesian updating rule as $$p(f \mid d) = \frac{p(d \mid f)p(f)}{p(d)}, \quad (1)$$

where the relation between facies and seismic data is given by their link to the elastic parameter m. In the problem of facies prediction from seismic, the elastic parameter is a nuisance parameter which should be marginalized. The marginalization corresponds to integrating out the effect of the elastic parameter. The posterior distribution for facies vector f given the seismic gather d can then be written $$p(f|d) = \int \ldots \int p(f|m)p(m|d)dm, \quad (2)$$

where p(f|m) can be regarded as the posterior distribution of the rock physics inversion, and p(m|d) is the posterior distribution for the seismic inversion, the integral is of dimension 3L. The posterior distribution of the rock physics inversion from elastic parameters to facies is defined by Bayes' law as $$p(f|m) \propto p(m|f)p(f), \quad (3)$$

with p(m|f) being the rock physics likelihood function and p(f) the facies prior model. Similarly, the posterior distribution for the seismic inversion of seismic data to elastic parameters is defined by $$p(m|d) \propto p(d|m)p(m), \quad (4)$$

where p(d|m) is the seismic likelihood function and p(m) is the prior model for the elastic parameters.

The rock physics relations are generally non-linear and assumed local in the sense that the rock parameters in one location only affect the elastic properties in that specific location, such that $$p(m_i|f) = p(m_i|f_i), \quad (5)$$

where the subscript i indicates that one specific location number i is considered, and $p(m_i|f_i)$ is the rock physics likelihood function. The rock physics likelihood can be estimated from well log samples or alternatively from samples simulated with a stochastic rock model. Rock physics models define the link from rock properties to effective elastic properties for each facies (Avseth et al., 2005). Typical rock properties are mineral composition, fluid saturation, porosity, and texture characteristics. A stochastic rock model can be used to simulate the probability distribution of the elastic properties according to specified probability distribution for the rock properties $r_i$:

$$p(m_i|f_i) = \int \ldots \int p(m_i|r_i,f_i)p(r_i|f_i)dr_i. \quad (6)$$

The seismic likelihood model is based on the seismic forward model defined in Buland and Omre (2003). A seismic time-angle gather can be written in the linear form, $$d = Gm + e, \quad (7)$$

where the elastic properties m will typically be represented by the logarithm of the P-wave velocity, S-wave velocities and the densities along the vertical profile, G is a modelling matrix, and e is an additive coloured Gaussian noise term. The modelling matrix can for example be defined by $$G = WAD, \quad (8)$$

where W is a block-diagonal matrix representing one wavelet for each angle, A is the matrix of angle dependent weak contrast coefficients defined by Aki and Richards (1980), and D is a differential matrix giving the contrasts of the elastic properties (logarithm of velocities and density), see Buland and Omre (2003) for more details. This defines the coloured Gaussian seismic likelihood function p(d|m).

Buland and Omre (2003) defined an efficient Bayesian linearized AVO inversion, assuming a Gaussian prior model for m. Combined with the likelihood model defined above, this gives explicit expressions for the posterior expectation and covariance.

The prior distribution of the elastic parameters can be modelled in a two-step approach. First the spatial distribution of facies is modelled. Next the distribution of elastic parameters is modelled given the facies. The facies distribution p(f) is defined on the space of all possible facies configurations in a vertical profile of L locations having a total of $N_f^L$ possible outcomes, where $N_f$ is the number of facies classes. The distribution p(f) is commonly defined by a Markov model or an object model.

The distribution of elastic parameters for a given facies configuration, p(m|f), is not fully specified by the point-wise rock physics likelihood (6). In addition to this, a dependency structure of the elastic parameters within and between facies is needed. This can for example be modelled by conditional quantile mappings of Gaussian random fields; see for example Kolbjornsen and Abrahamsen (2004). The prior distributions for the elastic parameters, p(m), will typically be multimodal with modes related to the different facies configurations, and is given by the expression $$p(m) = \sum_f p(m \mid f) p(f), \quad (9)$$

where the sum runs over all possible $N_f^L$ modes.

If only one location is considered, then it follows from expressions (5) and (9) that $$p(m_i) = \sum_{f_i=1}^{N_f} p(m_i \mid f_i) p(f_i), \quad (10)$$

where $N_f$ is the number of facies classes. This prior distribution will typically be multi-modal with peaks related to the different facies. Thus, $p(m_i)$ is not Gaussian. The multi-modal prior model $p(m_i)$ is not mathematically convenient as a prior model used in seismic inversion. If we approximate the prior model of $m_i$ with a Gaussian prior model $p_*(m_i)$ and use the seismic likelihood model defined above, we can use the fast seismic inversion method defined in Buland and Omre (2003), giving $p_*(m_i|d)$.

A point-wise approximation of the posterior facies probability can now be defined as $$p(f_i|d) \propto p(d|f_i) p(f_i), \quad (11)$$

where the proportionality constant is defined by the normalization $$\sum_{f=1}^{N} p(f_i \mid d) = 1, \quad (12)$$

and the approximate likelihood function is defined by the three dimensional integral $$p(d \mid f_i) \propto \int \int \int \frac{p(m_i \mid f_i) p_*(m_i \mid d)}{p_*(m_i)} dm_i. \quad (13)$$

This summarizes the location-wise method described in Buland et al. (2008). The seismic inversion result in a specific location is mapped to facies without considering the surrounding locations. This is suboptimal with respect to facies prediction. One problem is that a location-wise method may give high probability for brine (high density) above gas (low density) since there are no spatial relationships involved in the mapping.

Aspects of the invention are set out in the accompanying claims.

The invention will be further described, by way of example, with reference to the accompanying drawings, in which.

Figure 21:
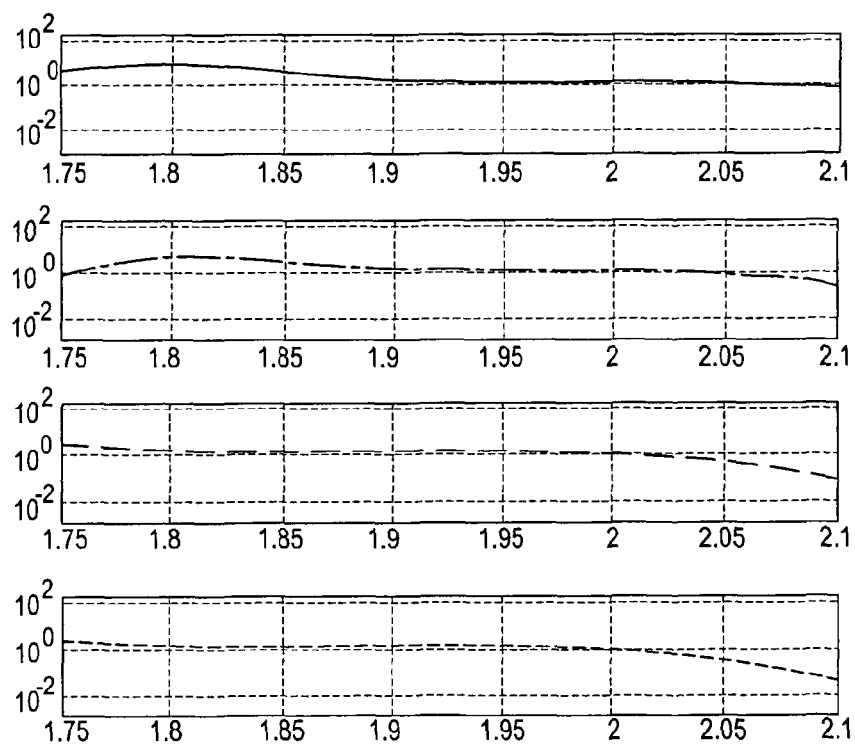
Figure 22:
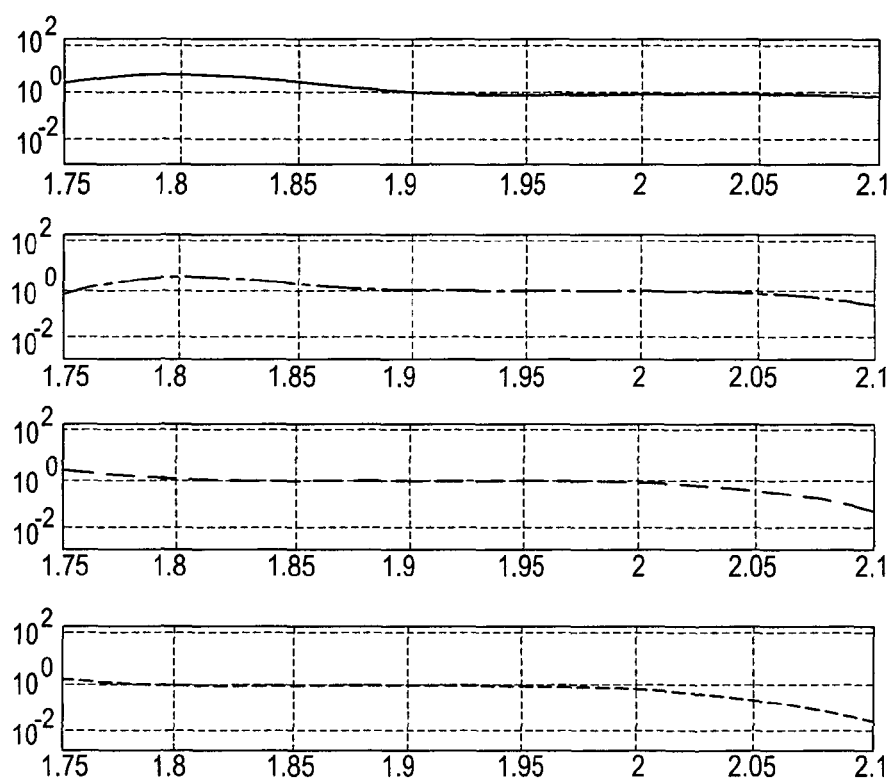

FIG. 21 illustrates the local adjustments for Gaussian distributions for shale, brine sand, fizz sand, and oil sand (top to bottom) according to an embodiment of the invention having a window comprising one location. against the logarithm of acoustic impedance; and FIG. 22 illustrates the local adjustments for Gaussian distributions for shale, brine sand, fizz sand, and oil sand (top to bottom) according to an embodiment of the invention having a window comprising two locations against the logarithm of acoustic impedance.

Figure 1:
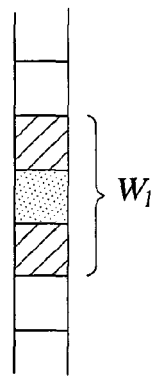
FIG. 1 illustrates a window comprising a plurality of locations, which may be used in an embodiment of the invention.

According to one embodiment of the invention, when the facies probability in one location is computed, all facies combinations in the neighbourhood of this location are considered. For example, FIG. 1 shows a location i of interest, and a neighbourhood to this location defined by a window $W_i$.

Figure 2:
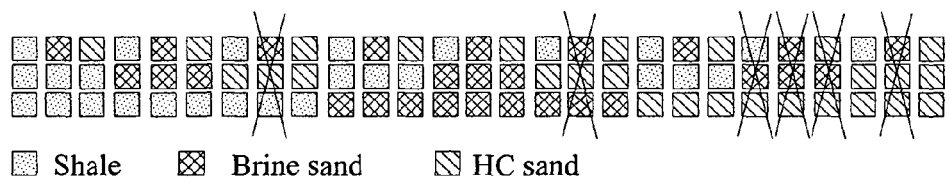
FIG. 2 illustrates a selection of possible combinations of facies, in a window comprising three locations, according to an embodiment of the invention.

Generally, the locations in the window $W_i$ may be any pre-selected set of locations close to i. In this neighborhood, all facies combinations are considered. Let $f_w$ denote the facies combinations in the neighborhood. We here suppress the location index i to simplify the notation. All possible configurations of $f_w$ are shown in FIG. 2 of the accompanying drawings, for the case with three locations in the window and three facies options being shale, brine sand, and hydrocarbon sand, giving $3^3=27$ combinations. Combinations with brine immediately above hydrocarbon are excluded since these are unphysical. This leaves 21 possible facies combinations $f_w$ in this window.

Rather than investigate all $N_f^L$ combinations of facies in the vertical profile, we investigate only the $N_f^w$ facies combinations in the window, where L is the number of locations in the vertical profile and w is the number of locations in the window. The challenge is to approximate the likelihood $p(d|f_w)$. This is done by first approximating the rock physics distribution given the local facies configuration $p(m|f_w)$ and then marginalizing the elastic parameters.

The probability distribution of the elastic parameters p(m) can be written as a weighted sum over the facies combinations inside the window $W_i$, $$p(m) = \sum_{f_w} p(m \mid f_w) p(f_w), \qquad (14)$$

where $f_w$ is the facies configurations in the window $W_i$, $p(f_w)$ is the probability function for these configurations, and $p(m|f_w)$ is the probability distribution of elastic parameters given the facies configuration in the window. The sum in expression (14) is over much fewer facies configurations than the representation in expression (9), and is easily handled as long as the window size is small. The rock physics likelihood $p(m|f_w)$ is approximated by a Gaussian distribution $p_*(m|f_w)$, although other distributions may be used. The approximation for the prior model for the elastic properties p(m) is thus a mixture of Gaussian distributions $$p(m) \approx \sum_{f_w} p_*(m \mid f_w) p(f_w). \qquad (15)$$

The Gaussian distribution $p_*(m|f_w)$ which approximates the rock physics likelihood $p(m|f_w)$ is completely defined by the expectation vector $\mu_{m|f_w}$ and covariance matrix $\Sigma_{m|f_w}$. Since the joint distribution of elastic parameters and facies configurations p(m,f) is known, these quantities can be computed as $E\{m|f_w\}$ and $Cov\{m|f_w\}$ from p(m,f).

The posterior probability for the facies configuration in the window is given as $$p(f_w|d) \propto p(d|f_w) p(f_w). \qquad (16)$$

Under the Gaussian approximation $p_*(m|f_w)$ of $p(m|f_w)$, we can marginalize the elastic parameter using the method defined in Buland and Omre (2003) for each facies configuration $f_w$. The resulting approximate likelihood function for the seismic data in the window, $p_*(d|f_w)$ is Gaussian with expectation vector and covariance matrix given as $$\mu_{d|f_w} = G\mu_{m|f_w},$$

$$\Sigma_{d|f_w} = G^T \Sigma_{m|f_w} G + \Sigma_e. \qquad (17)$$

The approximate likelihood $p_*(d|f_w)$ can thus be found by standard methodology. The approximate posterior probability function $p_*(f_w|d)$ for the facies configuration in the window can be computed by substituting the likelihood in expression (16) with the approximate likelihood. The posterior distribution is defined by the known prior probability of $p(f_w)$ and the Gaussian likelihood function $p_*(d|f_w)$ for the seismic data given the facies configuration in the window. This means that the approximate posterior distribution $p_*(f_w|d)$ can be obtained for all facies configurations $f_w$ by normalizing over all facies combinations in $f_w$. Under the Gaussian approximation, the posterior distribution of elastic parameter (i.e. m|d, $f_w$) is also Gaussian with mean and covariance given as $$\mu_{m|d,f_w} = \mu_{m|f_w} + \Sigma_{m|f_w} G \Sigma_{d|f_w}^{-1} (d - \mu_{d|f_w}),$$

$$\Sigma_{m|d,f_w} = \Sigma_{m|f_w} - \Sigma_{m|f_w} G \Sigma_{d|f_w}^{-1} G^T \Sigma_{m|f_w}. \qquad (18)$$

If the rock physics likelihood function p(m|f) happens to be Gaussian, the Gaussian approximation in (15) reproduces this distribution inside the window. If the rock physics likelihood is not Gaussian, it may be possible to further improve on the Gaussian approximation by adjusting the approximate distribution of elastic parameters such that it reproduces the rock physics distribution in location i.

We account for the non-Gaussian rock physics distribution in location i, $p(m_i|f_i)$, by correcting the Gaussian distribution in the location i where the inversion is performed. This results in the approximate distribution $$\tilde{p}(m) = \sum_{f_w} p_*(m|f_w) \frac{p(m_i|f_i)}{p_*(m_i|f_i)} p(f_w). \qquad (19)$$

This distribution has three desirable properties. First, it reproduces the distribution of the elastic parameters in location i. Second, it accounts for all facies configurations inside the window $W_i$. Third, all second order interactions between elastic parameters are captured, meaning that the expectation and covariance of the elastic parameters computed with the distribution in expression (19) are the same as those computed with the distribution in expression (9). The prior distribution in expression (19) yields the likelihood $$\tilde{p}(d|f_w) = p_*(d|f_w) \int \int \int \frac{p(m_i|f_i) p_*(m_i|d,f_w)}{p_*(m_i|f_i)} dm_i, \qquad (20)$$

where we have used that $p(m_i|f_w)=p(m_i|f_i)$ is the true distribution from the rock physics (see expression (6)), $p_*(m_i|f_i)$ and $p_*(m_i|d,f_w)$ are the conditional prior and posterior distributions of $m_i$ under the Gaussian approximation, and $p_*(d|f_w)$ is the likelihood computed under the Gaussian approximation.

Since $p_*(m_i|d,f_w)$ in Expression (20) is a Gaussian distribution, the data vector will only affect the mean value of this expression whereas the variance is determined by the data quality alone, i.e. $p_*(m_i|d,f_w)=g(\hat{\mu}_i(d,f_w),\hat{\Sigma}(f_w))$, where $\hat{\mu}_i(d,f_k)$ and $\hat{\Sigma}(f_w)$ are the conditional mean and variance of $m_i$ under the Gaussian approximation for facies configuration $f_w$. The conditional mean and variance of $m_i$ are given in expression (18). The fact that the conditional variance is independent of data makes it possible to precompute the integral term in expression (20) and store it in a table. One table is computed for each facies configuration and has the dimension of the local elastic parameter $m_i$. The table is computed as a convolution between the ratio $p(m_i|f_i)/p_*(m_i|f_i)$, and a Gaussian distribution with a known variance $\hat{\Sigma}(f_w)$:

$$L(b|f_w) = \int \int \int \frac{p(m_i|f_i) g(b, \hat{\Sigma}_i(f_w))}{p_*(m_i|f_i)} dm_i, \qquad (21)$$

where $L(b|f_w)$ denotes the precomputed table. The integral term in expression (20) is obtained by evaluating the precomputed table at the posterior mean for the elastic parameter given the facies configuration, i.e. $L(\hat{\mu}_i(d,f_w)|f_w)$.

An intuitive interpretation of the approximate likelihood in expression (20) is given in the following. The approximate likelihood contains a Gaussian likelihood term $p_*(d|f_w)$ and an integral term. The Gaussian term is identical to the contribution when a purely Gaussian distribution is assumed. The integral term corrects for the non-Gaussian distribution of the elastic parameters in location i, i.e. $m_i$. It is the average of the ratio between the rock physics model $p(m_i|f_i)$ and the Gaussian approximation $p_*(m_i|d,f_w)$. The average is taken over the posterior distribution of $m_i$ conditioned to the facies configuration $f_w$ under the Gaussian approximation, that is $p_*(m_i|d,f_w)$. When we use the Gaussian approximation for the true distribution of elastic parameters in one location, some values of $m_i$ are assumed to be more probable than they actually are and some values are less probable. The rock physics likelihood ratio $p(m_i|f_i)/p_*(m_i|f_i)$ expresses the error made in the approximation. If one considers a small region around $m_i$, the ratio says how much more likely it is to have this value under the true model than under the approximation. A value of 1 indicates they are equally likely, a value larger than one indicates that the true model is more likely than the approximation, and a value less than one indicates that the true model is less likely than the approximation. If the factor is identically one the term gives no adjustment. The factor $p_*(m_i|d,f_w)$ is the posterior probability of the local elastic parameter for a given facies configuration in the window. This factor indicates how likely the value $m_i$ is under the Gaussian approximation when also conditioned to seismic data. If this distribution is focused in a region where the likelihood ratio is high, this means that the Gaussian approximation underestimates the likelihood of this facies. This is corrected by the integral term in expression (20).

The method computes the posterior probabilities for facies configurations in the window around location i, and this is repeated for all windows. These probabilities are therefore computed at each location, so the results for all locations in the trace are obtained by investigating $L \cdot N_f^w$ facies combinations. This compares favourably with the complexity of the full distribution, which is $N_f^L$. There is more information contained in the posterior distribution for all facies combinations in the complete trace than that contained in the collection of all posterior distributions for the facies configurations in all the local windows. The probability of oil sand in one location can be computed both from the posterior distribution of the local windows and from the posterior for the complete trace, but, for example, the probability that a trace contains oil in one or several locations can only be obtained from the posterior distribution for all facies combinations in the complete trace. It is, however, possible to approximate the posterior distribution for all facies combinations in the trace by using the collection of posterior distributions for facies configurations in the local windows using a Markov chain approach.

The proposed method differs from the location-wise methods even if the window size is one, i.e. w=1. When w=1, the approximation still matches the mean and covariance of the true conditional distribution of the elastic properties given facies in the location $(m|f_i)$. The location-wise approach used in known methods assumes that the distribution of elastic parameters away from the inversion location i is conditionally independent of the facies in location i given the elastic parameter in location i. This is not true in general due to dependency in the facies. The local approach in Buland et al. (2008) is a special case of expression (20). where the Gaussian mixture in expression (15) reduces to a single Gaussian distribution. When no local facies information is used in the approximate distribution of the elastic parameters, the first term of expression (20), $p_*(d|f_w)$ reduces to a constant $p_*(d)$ and cancels out in the normalization.

The probability function of the facies configurations in the window $p(f_w)$ is known through the probability function $p(f)$ for the complete facies profile. The method for computing the probability function $p(f_w)$ for the possible facies configurations in the window may vary depending on how $p(f)$ is defined. One possibility is to sample from the distribution for the complete facies profile, $p(f)$, and approximate the probability for facies configurations in the window, $p(f_w)$, empirically. This can be done simply by counting the number of times each specific configuration occurs relative to the total number of samples.

The distribution of elastic parameters given local facies configuration $p(m|f_w)$ can be found from (9) by summing over all facies combinations that are not restricted inside the window. To formalize this, divide the facies profile f into two parts $f=[f_{-w}, f_w]$ where $f_w$ is the facies configurations in the locations inside the window (as earlier) and $f_{-w}$ denotes the facies configurations of the locations outside the window. We then find $$p(m|f_w) = \sum_{f_{-w}} p(m|f) p(f) / p(f_w), \quad (22)$$

where the sum is over all configurations outside the window, i.e. $f_{-w}$. Expression (22) has almost as many summands as expression (9) and is hence not useful in practice. The exact method for computing these quantities will be case dependent, but as for $p(f_w)$ these can be approximated by empirical relations by sampling from the joint distribution of elastic parameters and facies configurations $p(m,f)$ and then estimating the mean and variances in the relevant sub samples. That is, the expectation and variance are computed for samples that all have the same facies configuration in the window $W_i$. Replacing expression (9) with expression (15) simplifies the computations significantly. This allows us to approximate the posterior probability for the facies configuration in the window (see expression (16)) by considering only the facies configurations in the window rather than all facies configurations in the trace. The computational complexity and accuracy of the result can be balanced by adjusting the window size. A large window gives large accuracy but has large computational cost; a short window decreases the accuracy, but is also faster to compute. The construction in expression (15) allows us to avoid physically unlikely or impossible relations close to the location for inversion. This can be done by excluding unlikely or impossible facies combinations inside the window as shown in FIG. 2, and making the expectation and the variability correct for the elastic parameters conditioned to the facies combination in the window.

An example of use of the method is described hereinafter.

For a workflow, one can consider facies inversion in a region A. In this workflow we assume that the rock physics relations are stationary in the region A, we have $n_s$ volumes of seismic data potentially being PP (compressional reflected waves) or PS (compressional waves converted to shear waves by reflection) data from different angles. The seismic data has undergone processing such that it can be regarded as the response from a local 1D earth model and has been transformed from offset to reflection angles. The data cubes cover a region which extends a length T/2 above and below the region A. This additional data is included to account for boundary effects and T is typically slightly larger than the wavelet length. The seismic data has equal sampling interval dt throughout this extended region. Thus an interval of length T contains L sample points, i.e. L=T/dt. The number of sample points L for an interval of length T is much larger than the number of locations within the window, i.e. w<<L.

Consider now one location i inside the region A. Let $d_i$ denote a $L \cdot n_s$ vector consisting of seismic data from all seismic cubes in a region of length T/2 above and below the location i. As long as the location i is within the region A the distribution of $d_i$ will not depend on the particular location that is selected. Let therefore d denote a stochastic variable that has the same distribution as $d_i$.

Under the assumptions above, the workflow for computing the probability for the facies configuration conditioned to data $\tilde{p}(f_w | d_i)$ according to the above technique for all locations in region A is then:

1) Compute the approximate Gaussian distribution of elastic parameters given all facies configurations $f_w$ in the window, $p_*(m|f_w)$, from rock physics relations.
2) Compute the approximate distributions for seismic data given all facies configurations $f_w$ in the window, $p_*(d|f_w)$, by the relation in expression (17).
3) Compute the conditional variance under the Gaussian approximation, i.e. $\hat{\Sigma}(f_w)$, by using the relation in expression (18).
4) Compute the adjustment factor $L(b|f_w)$ for distribution as a lookup table by using the relation in expression (21).
5) For each location i in the region A
   a. Extract seismic data $d_i$
   b. For all facies configurations $f_w$
      i. Evaluate $a_i(f_w) = p_*(d_i | f_w)$
      ii. Compute $b_i(f_w) = \mu_i(d_i, f_w)$ using the relation in expression (18).
      iii. Look up $c_i(f_w) = L(b_i(f_w) | f_w)$
   c. Compute $$\tilde{p}(f_w | d_i) = \frac{p(f_w) a_i(f_w) c_i(f_w)}{\sum_{f_w} p(f_w) a_i(f_w) c_i(f_w)}$$

This workflow gives the probability for the local facies configuration around location i in the region A. Known local methods compute the point-wise probability for facies given seismic data $p(f_i = k | d_i)$. This quantity can also be obtained in the present method by summing all configurations that have facies number k in the central location, i.e.:

$$p(f_i = k | d_i) = \sum_{f_w : f_i = k} \tilde{p}(f_w | d_i)$$

In a workflow that computes the point-wise probability for facies given seismic data, this last step of marginalization is naturally included as step 5.d in the workflow above.

As a synthetic test case, we consider a case with four facies being shale, brine sand, fizz sand and oil sand. Fizz sand is a low saturated hydrocarbon sand. The elastic parameter considered is acoustic impedance (AI). The distribution of acoustic impedance is a truncated Gaussian distribution. The truncation is however at a distance far from the mean such that it does not affect the probabilities much. The logarithm of acoustic impedance z=ln(AI) is the model parameter that is used for the inversion. This has a distribution that is given by the expression $$p(z) = \frac{\exp(z)}{\sqrt{2\pi}\sigma} \exp\left(-\frac{(\exp(z) - \mu)^2}{2\sigma^2}\right) \quad (23)$$

Figure 3:
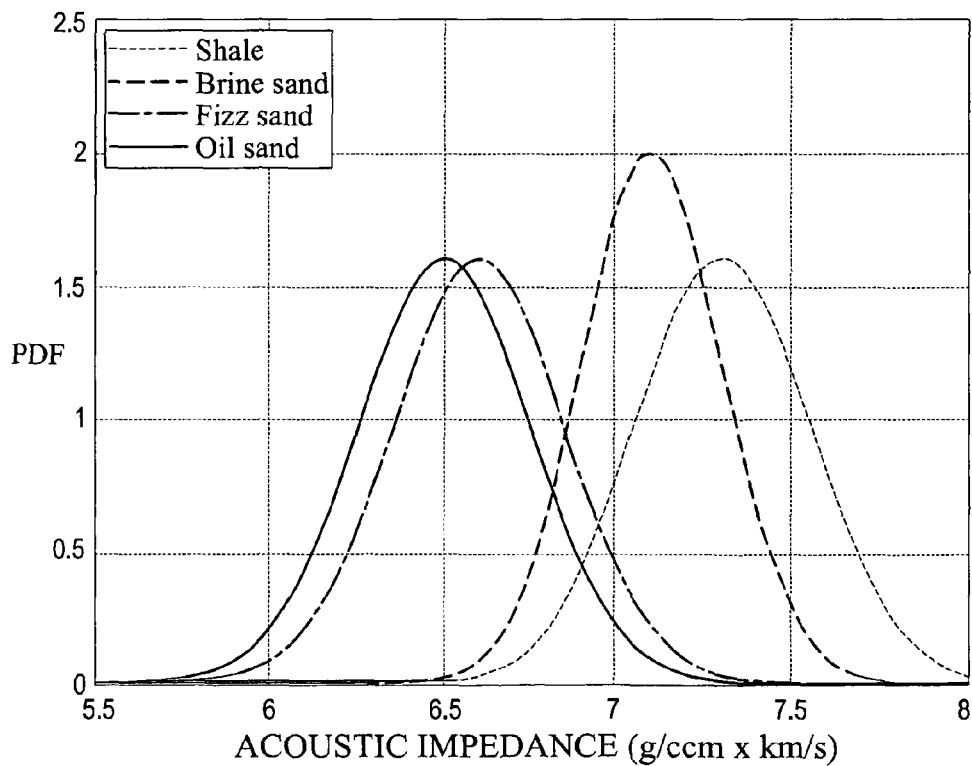
FIG. 3 is a graph showing examples of probability density functions for facies against acoustic impedance in grams per cubic centimeter multiplied by kilometers per second (g/ccm×km/s)

The parameters used for the four facies are shown in Table 1 below, along with the corresponding means and standard deviations. The distributions are shown in FIG. 3.

Figure 4:
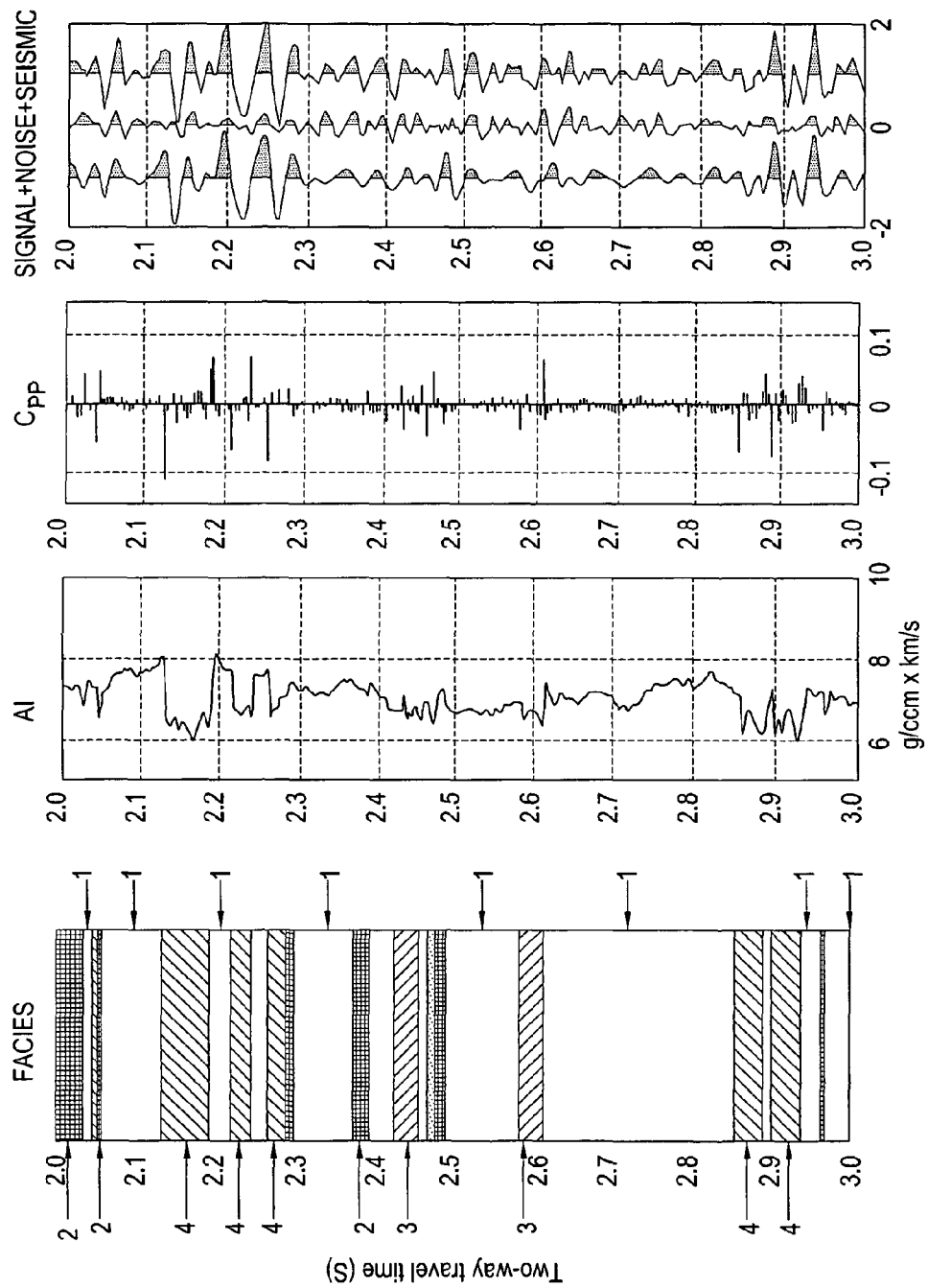
FIG. 4 illustrates a simulation showing a facies configuration and seismic data.

A synthetic trace of acoustic impedance is generated in a two-step approach. A background of shale is populated with vertically correlated acoustic impedance. In this background, sand bodies are distributed randomly throughout the trace. After the simulation of sand bodies, vertically connected sand bodies are assigned to fluids being either, brine, fizz, oil, brine-and-fizz, or brine-and-oil. In the cases with two fluids in a sand body, the fluid contact is assigned randomly within in the object. A vertically correlated random field is then simulated for each sand body and mapped to meet the expected value and the standard deviation of the fades per location. The synthetic seismic is generated using a Ricker wavelet with peak frequency of 25 Hz. The seismic signal is obtained from this by adding random noise. The signal to noise ratio, stated as the synthetic seismic energy to the energy in the error, is computed over the full trace. FIG. 4 shows details for one specific trace and displays the synthetic generated facies log, acoustic impedance, reflection coefficients Cpp and the corresponding seismic response. For the seismic response also an error term is added. In FIG. 4, panel A shows the initial facies configuration with shale 1, brine sand 2, fizz sand 3, and oil sand 4. Panel B shows the trace for acoustic impedance. Panel C shows the reflection coefficients for zero offset. Panel D shows the synthetic seismic energy for the reflection coefficients to the left, the error amplitudes in the middle, and the generated seismic energy on the right.

In the following, we compute a reference inversion by the local method described in Buland et al. (2008) and compare the results to the present technique with window sizes w=1 and w=2. We follow the workflow described above where we also include the marginalization. This is done in order to obtain quantities that can also be obtained with the local method.

Figure 5:
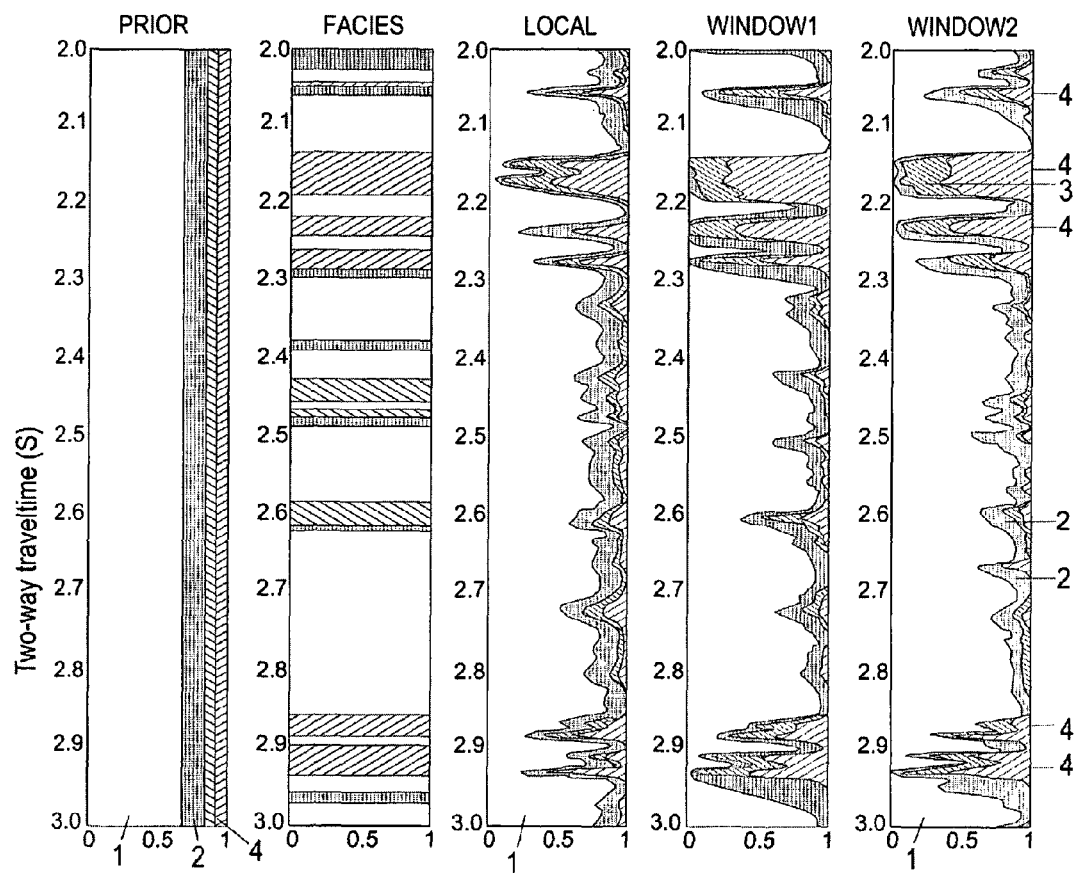
FIG. 5 illustrates a comparison of facies predictions using different prediction methods and parameters.

FIG. 5 shows the results from applying the three methods to the dataset shown in FIG. 4. From this figure we can visually see that the present technique improves the facies prediction. Here brine sand 2 has a larger probability below fizz sand 3 and oil sand 4 than above. In order to quantify the improvement of the prediction thoroughly, we estimated the pointwise facies probabilities in a trace containing $10^6$ sample points. We further average the facies probabilities for each facies class. The results are summarized in Table 2 to 4 for the known local technique and the two examples of the present technique respectively. Each column sums up to one and the best method is the one with the most probability on the diagonal. Weighting the diagonal elements with the prior probability for that facies gives one single measure of the performance for each method. This measures the average probability of predicting correct fades. The reference for this measure is the prior probabilities. This gives an average prediction probability of 0.534. By using the local method for updating, the data increase this prediction to 0.615. By applying the present technique with window size w=1 this is further increased to 0.656. Increasing the window size to w=2 does not give any significant further improvement with an average prediction probability of 0.658. The largest improvement over the local method is 10% in the prediction of brine, but also the predictions for oil and fizz have increased by more than 5%.

Figure 6:
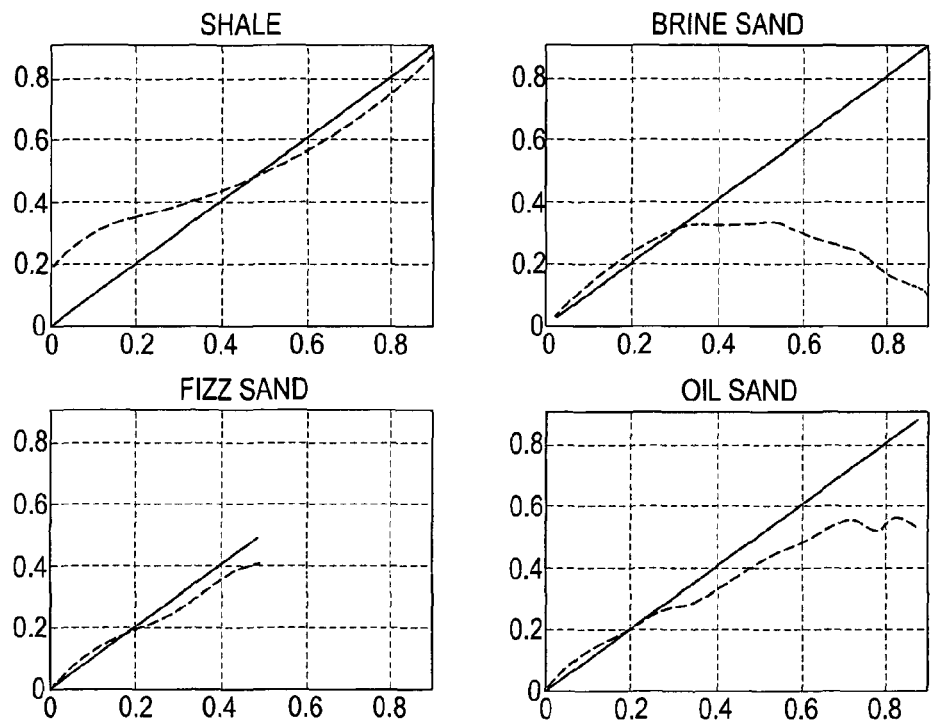
FIG. 6 illustrates the observed and predicted probabilities of different facies from simulations using an embodiment of the invention having a window comprising one location.
Figure 7:
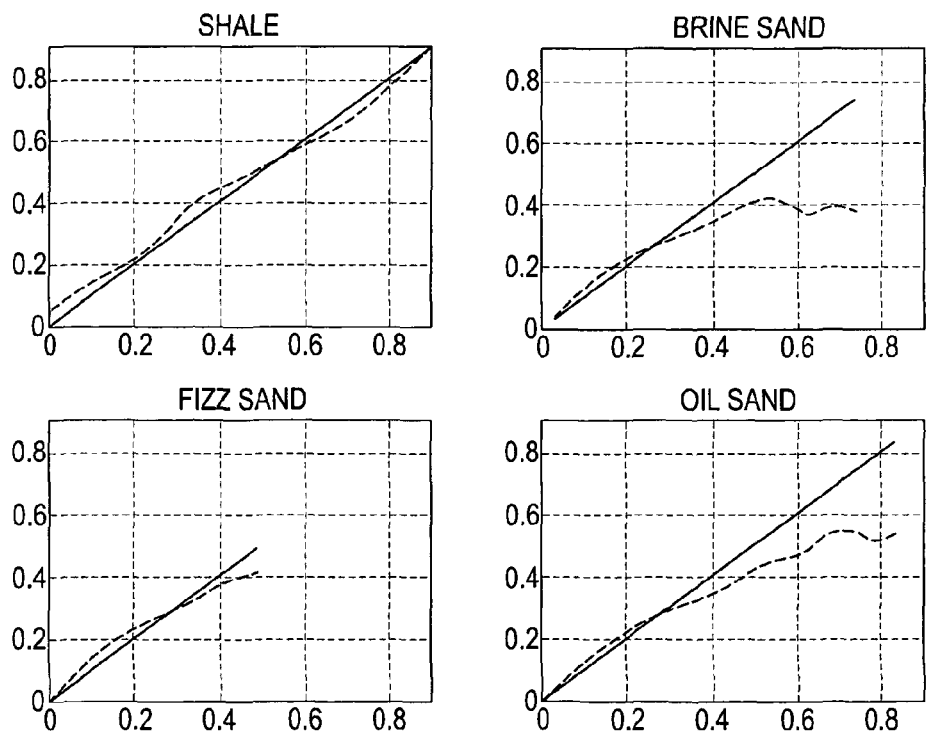
FIG. 7 illustrates the observed and predicted probabilities of different facies from simulations using an embodiment of the invention having a window comprising two locations.

The predicted facies probabilities are obtained based on approximations. It is therefore interesting to investigate the consistency of the prediction. One way of checking this is to investigate all locations that predict the same facies probability for a particular facies and to compute the fraction of these locations that actually have this facies. If the observed fraction is identical to the predicted fraction, the method is consistent. FIGS. 6 and 7 show a comparison between the predicted facies probabilities and observed fractions for window sizes w=1 and w=2, respectively. We see that by increasing the window size we improve consistency in the model.

TABLE 1

Prior mean and standard deviation

|  | $E\{Z\} = \mu$ | $Std\{Z\} = \sigma$ | $E\{\ln(Z)\}$ | $Std\{\ln(Z)\}$ |
|---|---|---|---|---|
| Shale | 7.3 | 0.25 | 1.99 | 0.034 |
| Brine sand | 7.1 | 0.20 | 1.96 | 0.028 |
| Fizz sand | 6.6 | 0.25 | 1.89 | 0.038 |
| HC sand | 6.5 | 0.25 | 1.87 | 0.039 |

TABLE 2

Average prediction probabilities using a local method.

|  | Shale | Brine | Fizz | Oil |
|---|---|---|---|---|
| Shale | 0.787 | 0.149 | 0.035 | 0.028 |
| Brine | 0.705 | 0.158 | 0.070 | 0.067 |
| Fizz | 0.437 | 0.138 | 0.194 | 0.231 |
| Oil | 0.381 | 0.126 | 0.219 | 0.274 |

TABLE 3

Average prediction probabilities using the novel method, window size w = 1.

|  | Shale | Brine | Fizz | Oil |
|---|---|---|---|---|
| Shale | 0.816 | 0.127 | 0.031 | 0.026 |
| Brine | 0.592 | 0.258 | 0.075 | 0.075 |
| Fizz | 0.347 | 0.156 | 0.231 | 0.267 |
| Oil | 0.270 | 0.146 | 0.258 | 0.326 |

TABLE 4

Average prediction probabilities using the novel method, window size w = 2.

|  | Shale | Brine | Fizz | Oil |
|---|---|---|---|---|
| Shale | 0.820 | 0.123 | 0.031 | 0.026 |
| Brine | 0.606 | 0.247 | 0.074 | 0.073 |
| Fizz | 0.345 | 0.155 | 0.233 | 0.268 |
| Oil | 0.269 | 0.145 | 0.260 | 0.326 |

REFERENCES

Avseth, P., Mukerji, T., and Mavko, G., 2005, Quantitative Seismic Interpretation: Cambridge University Press.

Buland, A. and Omre, H., 2003: Bayesian linearized AVO inversion. Geophysics, 68, 185-198.

Larsen, A. L. Ulvmoen, M, Omre. H. and Buland, A., 2006, Bayesian lithology/fluid prediction and simulation based on a Markov-chain prior model: Geophysics, 71, R69-R78.

Buland, A., Kolbjørnsen, O., Hauge, R., Skjæveland, Ø., and Duffaut, K., 2008, Bayesian Lithoiogy and Fluid prediction from seismic prestack data: Geophysics, vol. 73, issue 3, C13-C21

Kolbjørnsen, O. and Abrahamsen, P., 2004, Theory of the Cloud Transform for Applications: In Leuangthong, O. and Clayton, V., Geostatistics Banff, Volume 1.

The following demonstrates how to obtain the approximation of likelihood $p(d|f_w)$ that appears in equation (16). The approximation sought used the approximation $p(m|f_w) \approx \tilde{p}(m|f_w)$ where $\tilde{p}(m|f_w)$ is given in equation (19). By using standard rules of probability calculus, we derive the expression (20):

$$\tilde{p}(d \mid f_w) = \int \cdots \int p(d \mid m, f_w)\tilde{p}(m \mid f_w)dm$$

$$= \int \cdots \int p(d \mid m, f_w)p_*(m \mid f_w)dm_{-i}\frac{p(m_i \mid f_w)}{p_*(m_i \mid f_w)}dm_i \quad (5)$$

$$= \int\int\int p_*(d, m_i \mid f_w)\frac{p(m_i \mid f_w)}{p_*(m_i \mid f_w)}dm_i$$

$$= \int\int\int p_*(d \mid f_w)p_*(m_i \mid f_w, d)\frac{p(m_i \mid f_w)}{p_*(m_i \mid f_w)}dm_i \quad (10)$$

$$= p_*(d \mid f_w)\int\int\int p_*(m_i \mid f_w, d)\frac{p(m_i \mid f_w)}{p_*(m_i \mid f_w)}dm_i$$

Figure 8:
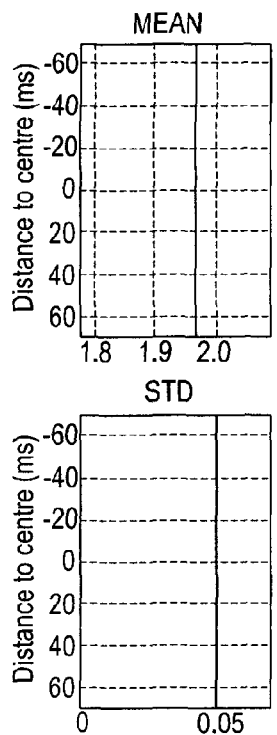
FIG. 8 illustrates the vertical mean and standard deviation of model parameters in units of logarithm of acoustic impedance using a local approach with one Gaussian distribution.
Figure 9:
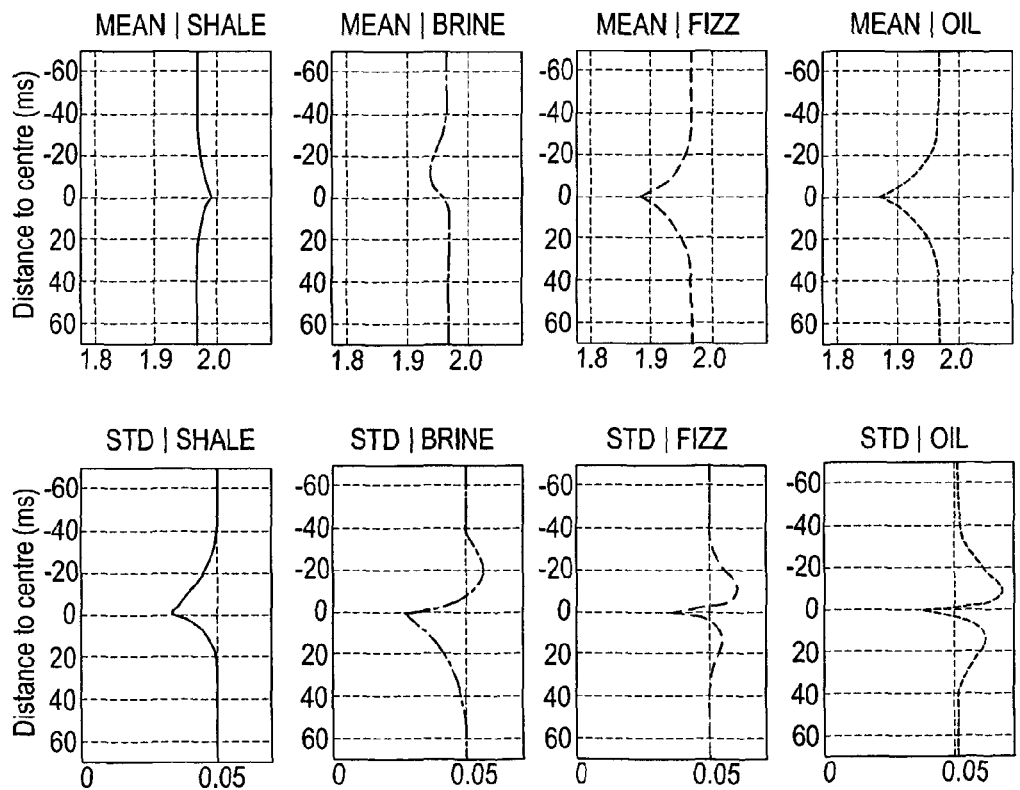
FIG. 9 illustrates the vertical mean and standard deviation of model parameters using an embodiment of the invention with four Gaussian distributions for approximating the model parameters.
Figure 10:
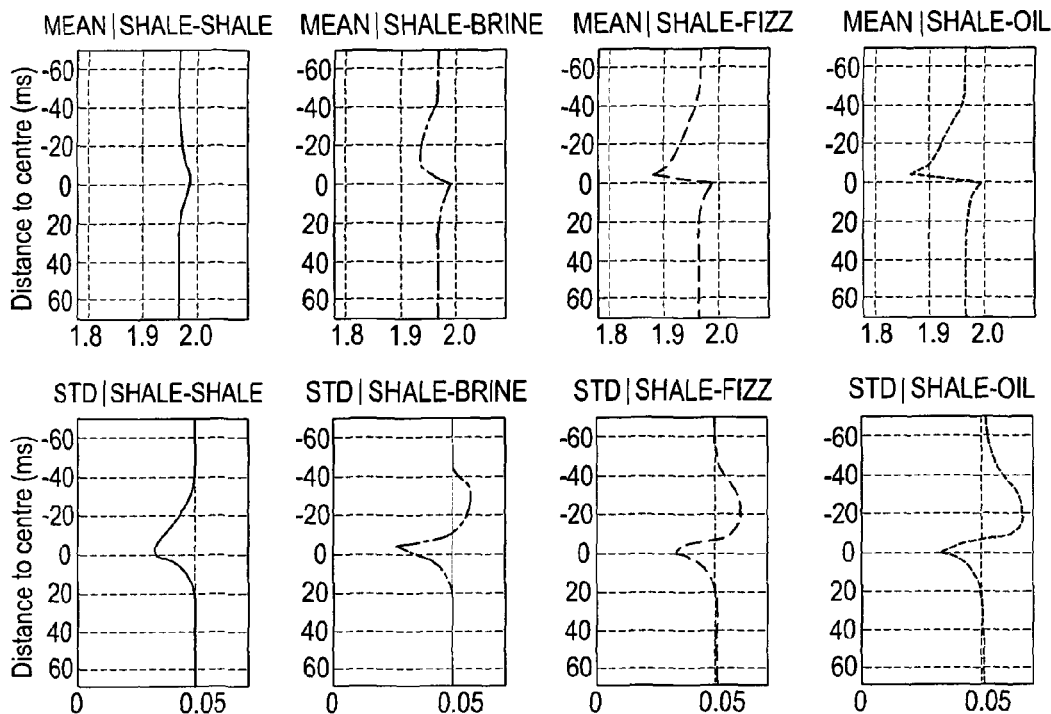
FIG. 10 illustrates the vertical mean and standard deviation of model parameters using an embodiment of the invention with four Gaussian distributions for approximating the transitions from shale to all facies.
Figure 11:
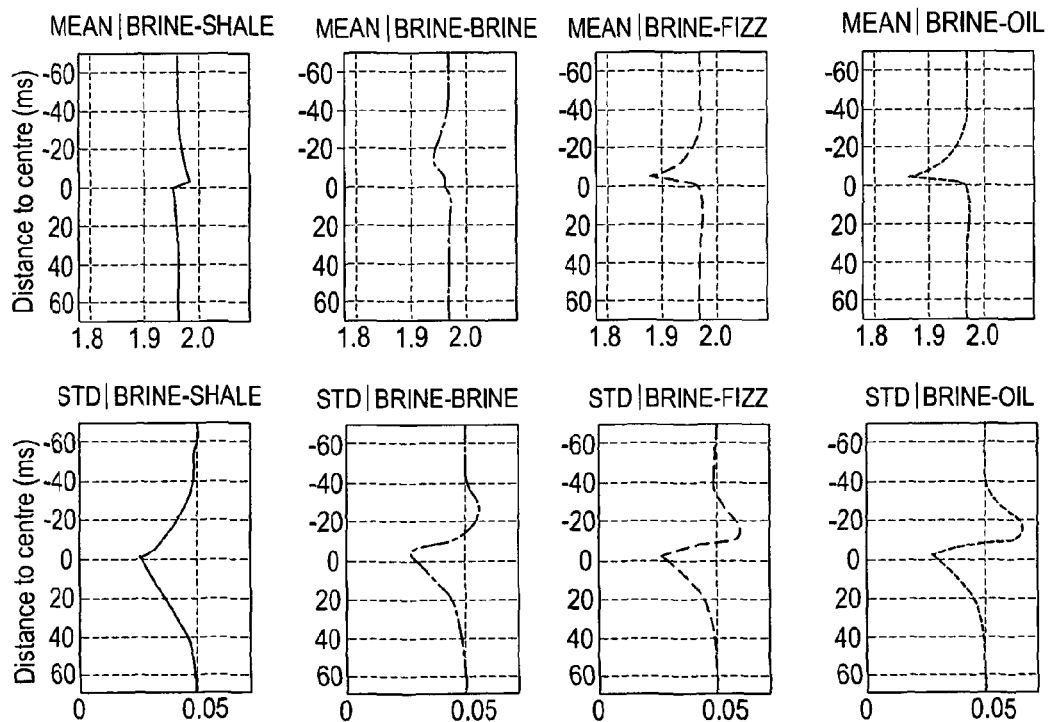
FIG. 11 illustrates the vertical mean and standard deviation of model parameters using an embodiment of the invention with four Gaussian distributions for approximating the transitions from brine sand to all facies.
Figure 12:
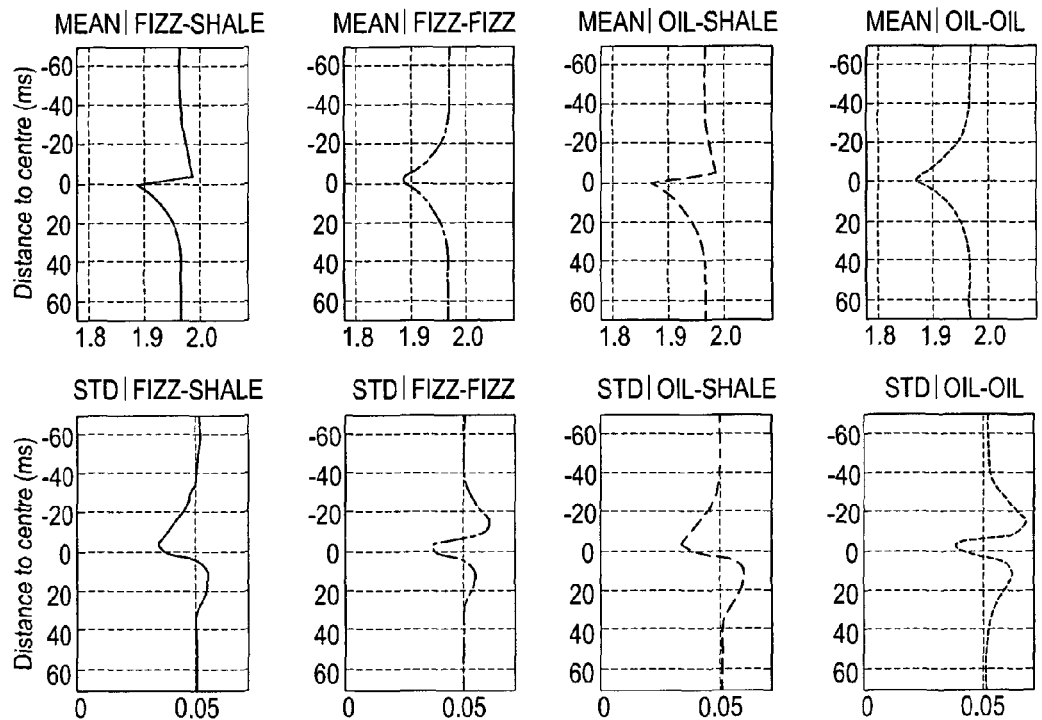
FIG. 12 illustrates the vertical mean and standard deviation of model parameters using an embodiment of the invention with four Gaussian distributions for approximating the transitions from fizz sand and from oil sand.
Figure 13:
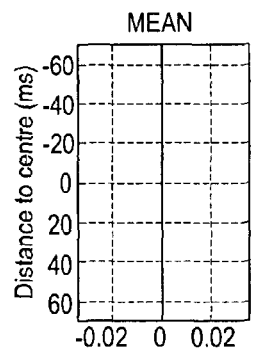
FIG. 13 illustrates the vertical mean and standard deviation of seismic data using the local approach with one Gaussian distribution.
Figure 13:
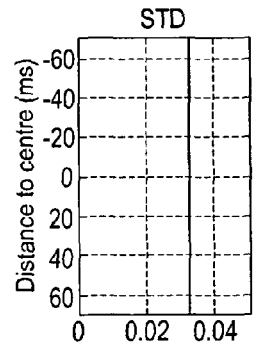
Figure 14:
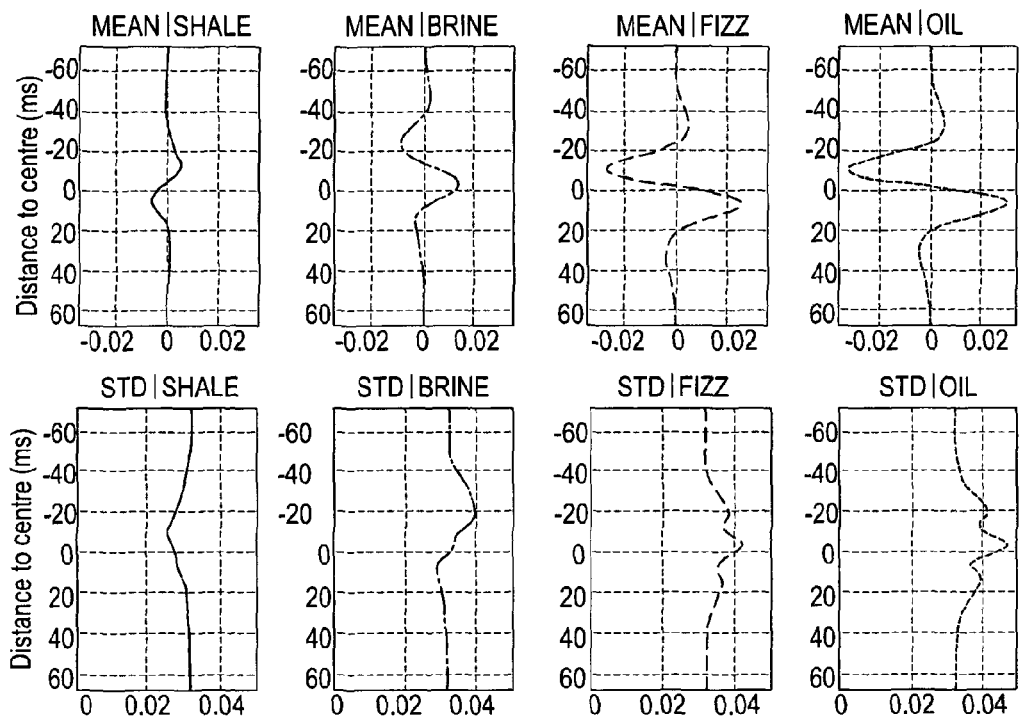
FIG. 14 illustrates the vertical mean and standard deviation of seismic data using an embodiment of the invention with four Gaussian distributions for approximating the seismic data.
Figure 15:
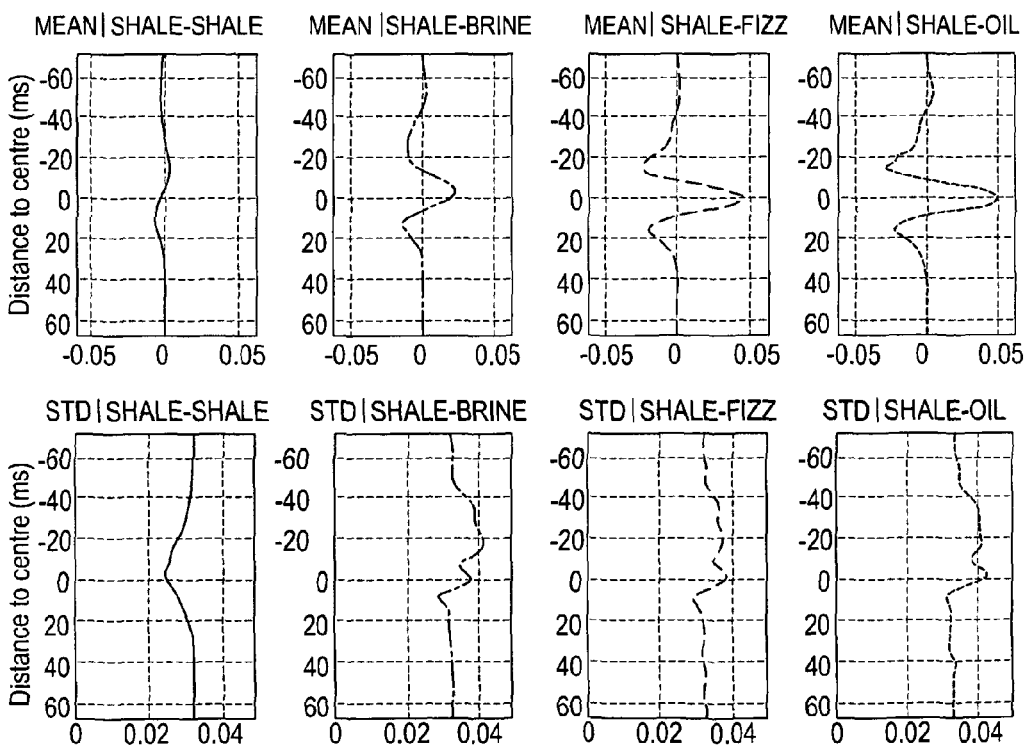
FIG. 15 illustrates the vertical mean and standard deviation of seismic data using an embodiment of the invention with four Gaussian distributions for transitions from shale to all facies.
Figure 16:
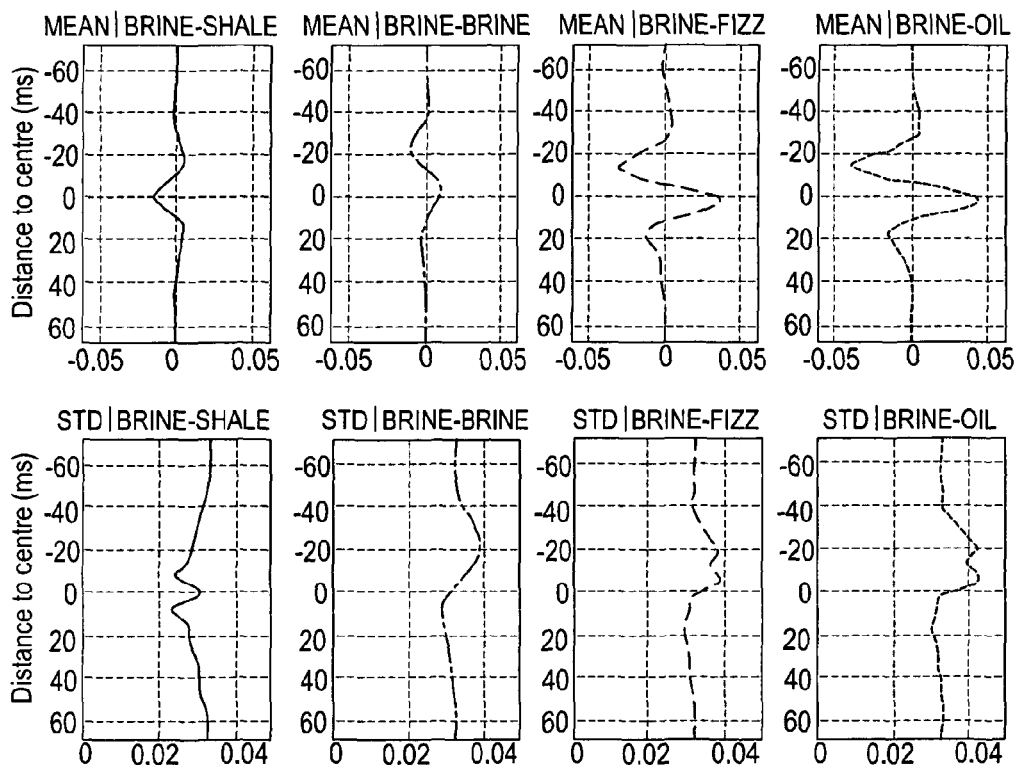
FIG. 16 illustrates the vertical mean and standard deviation of seismic data using an embodiment of the invention with four Gaussian distributions for transitions from brine to all facies.
Figure 17:
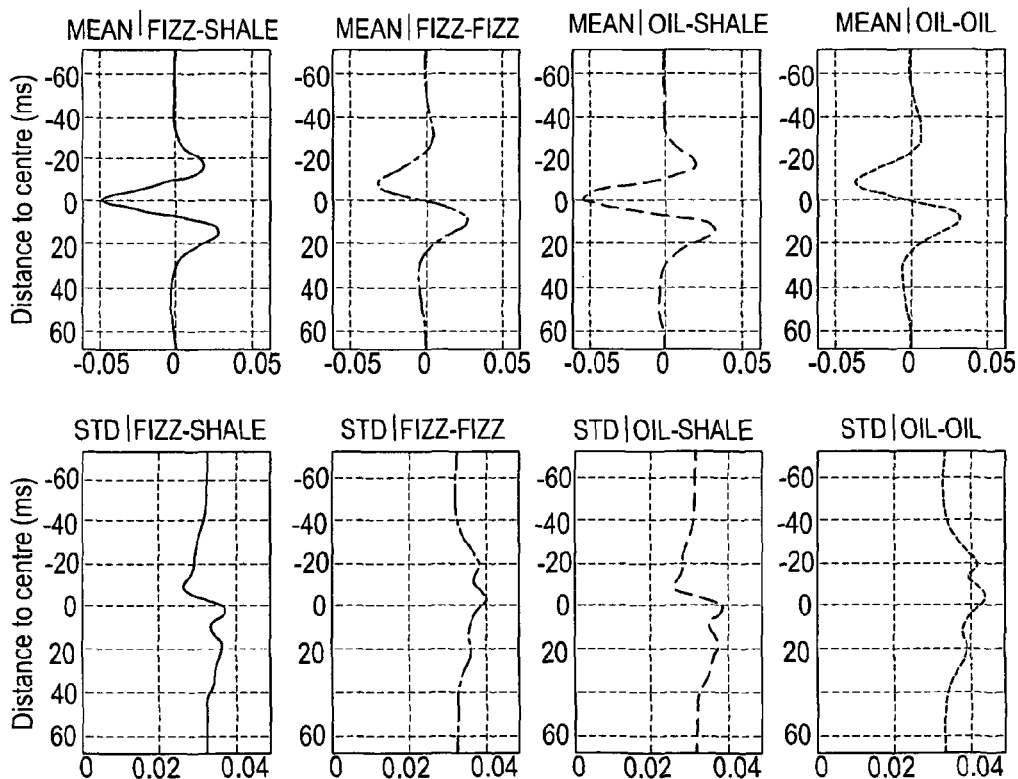
FIG. 17 illustrates the vertical mean and standard deviation of seismic data using an embodiment of the invention with four Gaussian distributions for transitions from fizz sand and oil sand.

For the example above we generated a trace consisting of $10^6$ time samples. This trace was used to calibrate the rock physics model. Tables 5 and 6 yield $p(f_w)$ for window sizes w=1 and w=2 respectively. These are easily computed from the generated trace. In Table 6 there is zero probability of the configuration brine above fizz, brine above oil, oil above fizz and fizz above oil. The first two indicate that hydrocarbons are always above brine, the latter two indicate that fizz and oil do not occur in the same reservoir. FIG. 8 shows the mean and standard deviation that is used for the approximate Gaussian distribution of the logarithm of acoustic impedance in the local method i.e. Buland et al. (2008). FIG. 9 shows the means and standard deviations for the four Gaussian distributions that are used for the logarithm of acoustic impedance in the case of an embodiment having a window size w=1. Each Gaussian distribution corresponds to one facies configuration in the window. For window size w=1, this means one distribution for each facies in the central location. In the sum in expression (15) the distributions displayed in FIG. 9 are the Gaussian distributions $p_*(m \mid f_w)$ which correspond to the probabilities $p(f_w)$ in Table 2. FIGS. 10 to 12 show the means and standard deviations for the twelve Gaussian distributions that are used for the logarithm of acoustic impedance in the case of an embodiment having a window size w=2. For window size w=2, these correspond to the twelve facies transitions. The sum in expression (15) comprise the Gaussian distributions $p_*(m \mid f_w)$ shown in FIGS. 10 to 12 that correspond to the probabilities $p(f_w)$ in Table 6. FIGS. 13 to 17 show the Gaussian distributions $p_*(d \mid f_w)$ that correspond to the distributions $p_*(m \mid f_w)$ in FIGS. 8 to 12. The local method illustrated in FIGS. 8 and 13 has a stationary mean and standard deviation. The Gaussian distributions that are used in the present technique have a distinct behaviour around the central location and approach a stationary behaviour when going away from the central location.

Figure 18:
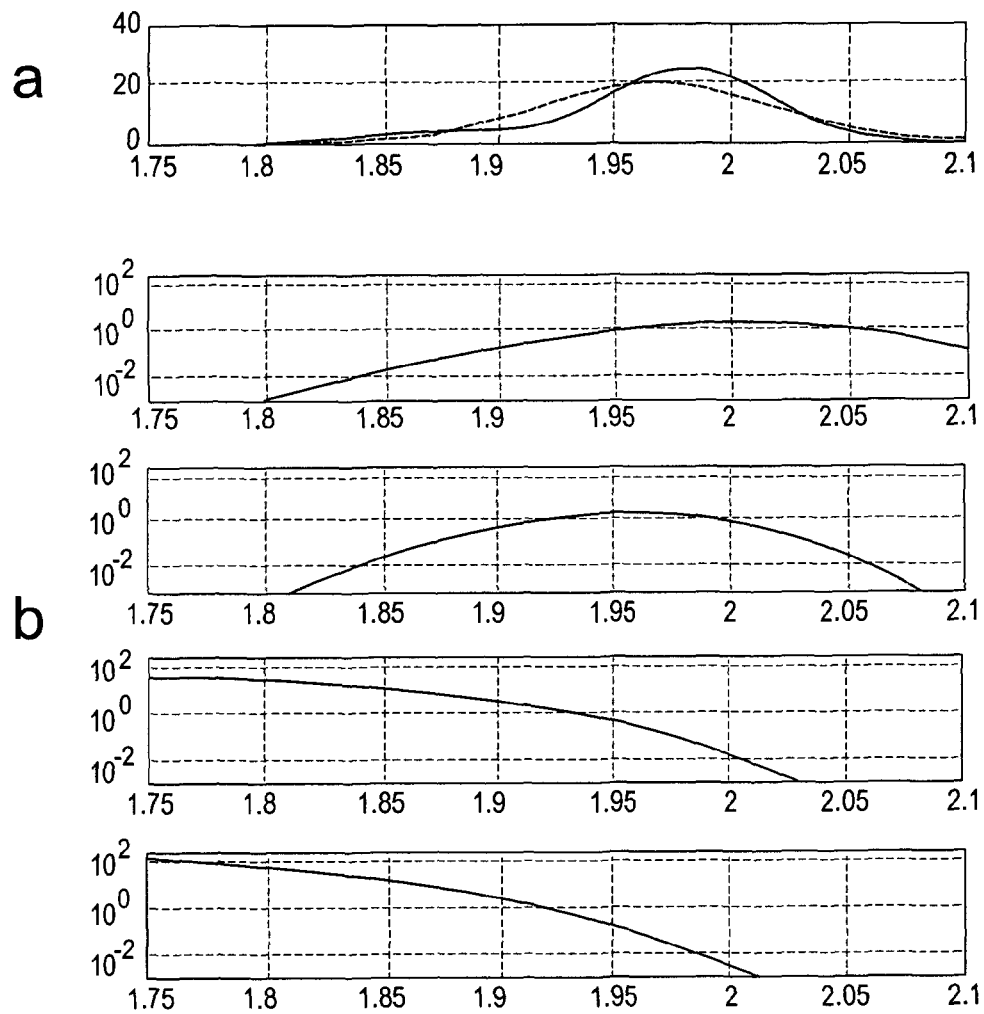
FIG. 18a is a graph showing the distribution of the elastic parameter (solid line) and the Gaussian approximation (dashed line)
FIG. 18b illustrates the ratio $p(m_i|f_i)/p_*(m_i)$ for shale, brine sand, fizz sand, and oil sand (top to bottom) against the logarithm of acoustic impedance.
Figure 19:
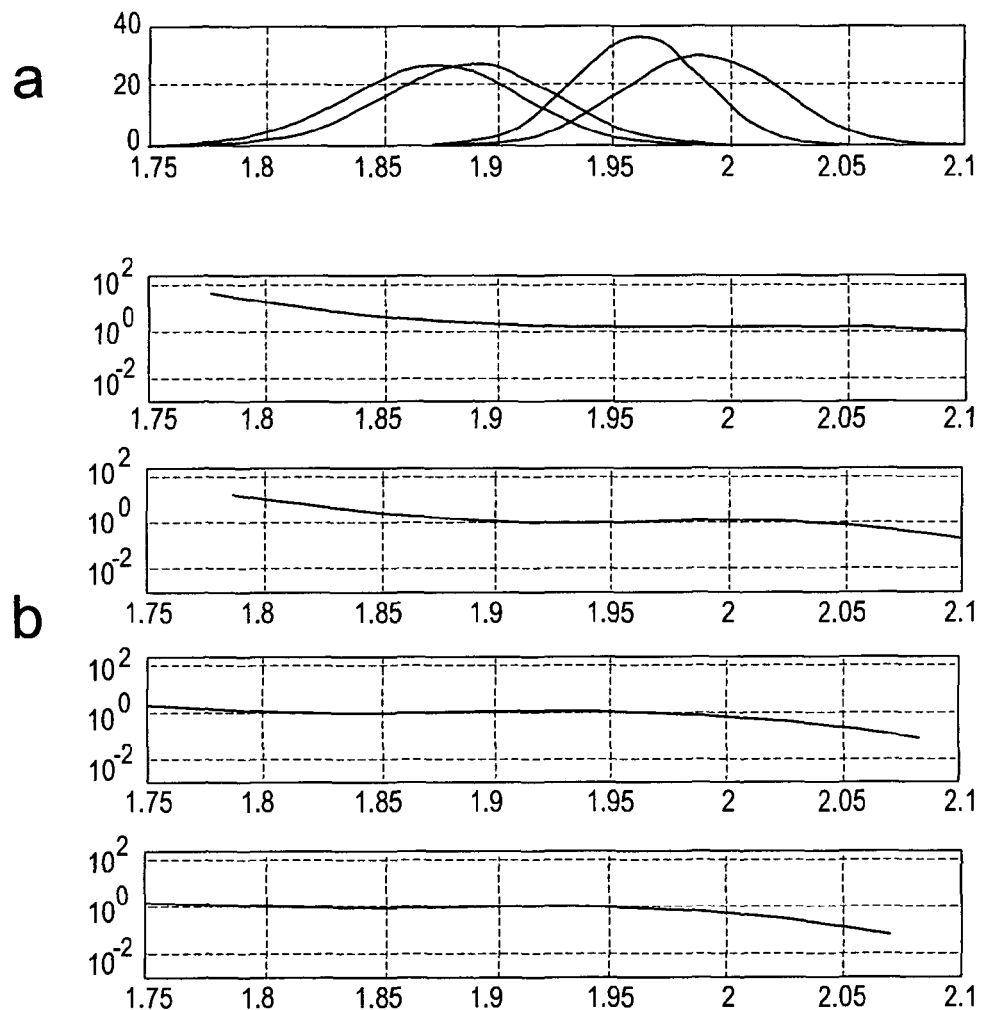
FIG. 19a is a graph showing the distribution of elastic parameters (solid lines) and the Gaussian approximations (dashed lines) for shale, brine sand, fizz sand, and oil sand.
FIG. 19b shows the ratio $p(m_i|f_i)/p_*(m_i|f_i)$ for shale, brine sand, fizz sand, and oil sand (top to bottom) against the logarithm of acoustic impedance.
Figure 20:
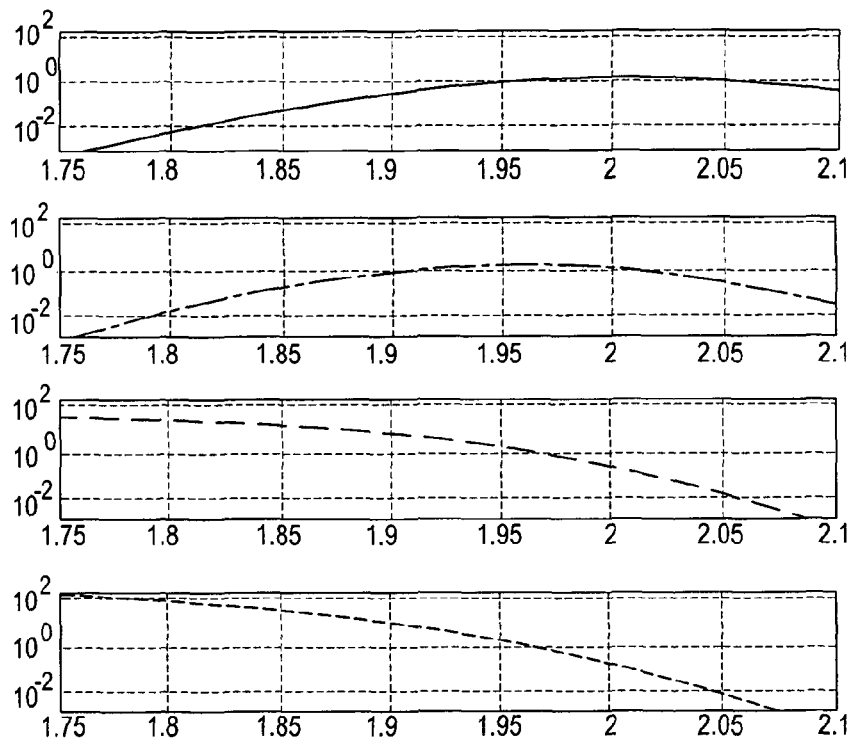
FIG. 20 illustrates the local adjustments for Gaussian distributions in the local approximation method for shale, brine sand, fizz sand, and oil sand (top to bottom) against the logarithm of acoustic impedance.

The adjustment for the non-Gaussian distribution is given by the integral in expression (21). FIG. 18*a* shows a comparison between the distribution of the elastic parameter and the Gaussian approximation that is used in the local approach of Buland et. al. (2008). In FIG. 18*b* the ratio $p(m_i \mid f_i)/p_*(m_i)$ is shown on a logarithmic scale. In FIGS. 19*a* and 19*b* the corresponding plots are shown for the present technique. Since we only adjust for the distribution in one point, the ratio $p(m_i \mid f_i)/p_*(m_i \mid f_i)$ is common for all window sizes, in particular for window sizes w=1 and w=2. The posterior covariance $\tilde{\Sigma}(f_w)$ is listed in Tables 7 to 9 for the local method and for embodiments of window sizes w=1 and w=2, respectively. By using the ratios and the posterior standard deviations, the adjustment for the non-Gaussian distribution given in expression (21) can be computed. This adjustment is displayed in FIGS. 20 to 22. The adjustment factor is much larger in the local method since this is the only contribution to the likelihood. When the window size is two in the present technique, there should be twelve different adjustment but, since there is so little difference in the posterior standard deviations for a given facies, it is impossible to distinguish between ratios that are caused by different smoothing factors.

TABLE 5

Facies probabilities. The table displays the observed fractions of facies.

| Shale | Brine | Fizz | Oil |
|---|---|---|---|
| 0.709 | 0.145 | 0.073 | 0.073 |

TABLE 6

Probability of facies configurations. The table displays the observed fraction of the facies configuration in two neighbouring cells. The left column denotes the lower facies. The top row denotes the upper facies.

|  | Shale | Brine | Fizz | Oil |
|---|---|---|---|---|
| Shale | 0.666 | 0.035 | 0.004 | 0.004 |
| Brine | 0.007 | 0.110 | 0.014 | 0.014 |
| Fizz | 0.018 | 0 | 0.055 | 0 |
| Oil | 0.018 | 0 | 0 | 0.055 |

TABLE 7

Prior and posterior standard deviations for an elastic parameter local approach.

|  | Local |
|---|---|
| Prior | 0.051 |
| Posterior | 0.038 |

TABLE 8

Prior and posterior standard deviations for approximate distributions at the central location, for window size w = 1.

|  | Shale | Brine | Fizz | Oil |
|---|---|---|---|---|
| Prior | 0.034 | 0.028 | 0.038 | 0.039 |
| Posterior | 0.032 | 0.025 | 0.032 | 0.033 |

TABLE 9

Prior and posterior standard deviations for approximate distributions at the central location, for window size w = 2.

|  | Shale-Shale | Shale-Brine | Shale-Fizz | Shale-Oil |
|---|---|---|---|---|
| Prior | 0.034 | 0.034 | 0.034 | 0.034 |
| Posterior | 0.031 | 0.029 | 0.031 | 0.031 |
|  | Brine-Shale | Brine-Brine | Brine-Fizz | Brine-Oil |
| Prior | 0.028 | 0.028 | 0.028 | 0.028 |
| Posterior | 0.025 | 0.025 | 0.024 | 0.024 |
|  | Fizz-Shale | Fizz-Fizz | Oil-Shale | Oil-Oil |
| Prior | 0.038 | 0.038 | 0.039 | 0.039 |
| Posterior | 0.032 | 0.031 | 0.032 | 0.032 |

Various modifications may be made.

The invention may be put into practice by variations of the techniques discussed thus far. For example, the data used to predict facies probability may come from sources other than seismic. However, preferably there would be an approximate linear link between the rock physics parameters and the data.

Additionally, the approximation distribution may be other than Gaussian. For example, elliptical or skew normal distributions may be used. Using these distributions, the likelihood of the data can be directly assessed using the model.

The invention claimed is:

1. A method of determining a rock facies in a subterranean region of the Earth at a first location, comprising the steps of:
   obtaining seismic data associated with said region;
   selecting a plurality of facies;
   providing a first rock physics probability distribution with spatial dependencies;
   providing a second rock physics probability distribution around the first location comprising at least one probability distribution per facies, wherein the spatial dependencies in the first rock physics probability distribution are utilized, such that the second rock physics distribution provides a simplifying approximation of the first rock physics distribution;
   performing a Bayesian inversion at the first location by a computer processor using the second rock physics probability distribution to predict the probability of the rock facies at said location taking into account said seismic data, in order to indicate a presence of said facies in said region; and
   correcting for deviations of the approximating distribution at the first location with a correction term to reproduce the rock physics probability distribution at the first location.

2. The method as claimed in claim 1, wherein the Bayesian inversion step provides a posterior rock physics probability distribution of the rock physics probability distribution.

3. The method as claimed in claim 2, wherein the step of approximating the posterior rock physics probability distribution comprises summing the approximating distributions in the window.

4. The method as claimed in claim 1, wherein the at least one distribution is Skew Normal.

5. The method as claimed in claim 1, wherein the at least one distribution is Elliptical.

6. The method as claimed in claim 1, wherein the at least one distribution is Gaussian.

7. The method as claimed in claim 1, wherein the correction term is the average of the ratio between the rock physics model at a location and the approximating distribution.

8. The method as claimed in claim 1, wherein the correction term is retrieved from a table.

9. The method as claimed in claim 1, wherein the correction term is given by the formula:

$$\tilde{p}(d \mid f_w) = p_*(d \mid f_w) \int \int \int \frac{p(m_i \mid f_i) p_*(m_i \mid d, f_w)}{p_*(m_i \mid f_i)} dm_i$$

where:
d is the time-angle gather,
$f_w$ is the facies within the window,
$m_i$ is the elastic property at the first location,
$f_i$ is the facies at the first location,
$p(m_i|f_w) = p(m_i|f_i)$ is the true distribution from the rock physic,
$p_*(m_i|f_i)$ and $p_*(m_i|d, f_w)$ are conditional prior and posterior distributions of $m_i$ using a Gaussian approximation, and $p_*(d|f_w)$ is the likelihood function computed using the Gaussian approximation.

10. A computer program product embodied on a non-transitory computer readable medium, the computer program product comprising computer-executable instructions to perform the method as claimed in claim 1.

11. A computer programmed to perform the method as claimed in claim 1.

12. A method of determining a rock facies in a subterranean region of the Earth at a first location comprising the steps of:
   obtaining seismic data associated with said region;
   selecting a plurality of facies;
   providing a first rock physics probability distribution with spatial dependencies;
   providing a second rock physics probability distribution around the first location comprising at least one distribution per combination of facies in a window comprising the first location and at least one further location, whereby the second rock physics distribution provides a simplifying approximation of the first rock physics distribution;
   performing a Bayesian inversion by a computer processor using the second rock physics probability distribution to predict the probability of the rock facies at said first location taking into account the seismic data, in order to indicate a presence of said facies in said region; and
   correcting for deviations of the approximating distribution at the first location with a correction term to reproduce the rock physics probability distribution at the first location.

13. The method as claimed in claim 12, wherein the Bayesian inversion step predicts the probability of the facies or the facies combinations in the window.

14. The method as claimed in claim 12, wherein a likelihood term in the Bayesian inversion is evaluated directly from at least one rock physics distribution per combination of facies.

15. The method as claimed in claim 12, wherein the combinations of facies exclude impossible combinations of facies.

16. The method as claimed in claim 12, wherein the combinations of facies exclude physically impossible combinations of facies.

17. The method as claimed in claim 12, wherein the combinations of facies exclude combinations of facies that would not be expected to occur naturally.

18. The method as claimed in claim 12, wherein the combinations of facies exclude combinations of facies that would not be expected to occur naturally.

19. The method as claimed in claim 16, where combinations of facies are excluded based on prior information.

20. The method as claimed in claim 12, wherein the approximation of the rock physics probability is the same for all locations that have the same facies configuration in the window.

21. A computer program product embodied on a non-transitory computer readable medium, the computer program product comprising computer-executable instructions to perform the method as claimed in claim 12.

22. A computer programmed to perform the method as claimed in claim 12.

23. A method of determining a rock facies in a subterranean region of the Earth, comprising the steps of:
   obtaining seismic data associated with said region;
   providing a distribution of rock physics probability;
   selecting a plurality of facies;

modifying the rock physics probability at a first location by excluding one or more combinations of facies in a window comprising the first location and one or more further locations; and performing a Bayesian inversion at the first location by a computer processor to predict the probability of the rock facies at said location taking into account the seismic data, in order to indicate a presence of said facies in said region.

24. The method as claimed in claim 23, wherein the one or more excluded combinations of facies comprise impossible combinations of facies.

25. The method as claimed in claim 23, wherein the one or more excluded combinations of facies comprise physically impossible combinations of facies.

26. The method as claimed in claim 23, wherein one or more excluded combinations of facies comprise combinations of facies that would not be expected to occur naturally.

27. The method as claimed in claim 23, wherein the one or more excluded combinations of facies comprise combinations of facies that would not be expected to occur naturally.

28. The method as claimed in claim 23, wherein the one or more excluded combinations of facies are excluded based on prior information.

29. A computer program product embodied on a non-transitory computer readable medium, the computer program product comprising computer-executable instructions to perform the method as claimed in claim 23.

30. A computer programmed to perform the method as claimed in claim 23.

31. A method of determining a rock facies in a subterranean region of the Earth at a first location, comprising the steps of:
obtaining seismic data associated with said region;
selecting a plurality of facies;
providing a first rock physics probability distribution with spatial dependencies;
obtaining a second rock physics probability distribution comprising at least one probability distribution per facies utilizing the spatial dependencies in the first rock physics probability distribution wherein the second rock physics distribution provides a simplifying approximation of the first rock physics distribution around the first location;
performing a Bayesian inversion at the first location by a computer processor using the second rock physics probability distribution to predict the probability of the rock facies at said location taking into account said seismic data, in order to indicate a presence of said facies in said region; and
correcting for deviations of the approximating distribution at the first location with a correction term to reproduce the rock physics probability distribution at the first location.

32. A method of determining a rock facies in a subterranean region of the Earth at a first location comprising the steps of:
obtaining seismic data associated with said region;
selecting a plurality of facies;
providing a first rock physics probability distribution with spatial dependencies;
obtaining a second rock physics probability distribution comprising at least one distribution per combination of facies in a window comprising the first location and at least one further location, wherein the second rock physics distribution provides a simplifying approximation of the first rock physics distribution around the first location;
performing a Bayesian inversion by a computer processor using the second rock physics probability distribution to predict the probability of the rock facies at said first location taking into account the seismic data, in order to indicate a presence of said facies in said region; and
correcting for deviations of the approximating distribution at the first location with a correction term to reproduce the rock physics probability distribution at the first location.

33. A method of determining a rock facies in a subterranean region of the Earth at a first location, comprising the steps of:
obtaining seismic data associated with said region;
selecting a plurality of facies;
providing a first rock physics probability distribution with spatial dependencies;
approximating the first rock physics probability distribution around the first location with at least one probability distribution per facies utilizing the spatial dependencies in the first rock physics probability distribution, to obtain a simplified, second rock physics distribution;
performing a Bayesian inversion at the first location by a computer processor using the simplified, second rock physics probability distribution to predict the probability of the rock facies at said location taking into account said seismic data, in order to indicate a presence of said facies in said region; and
correcting for deviations of the approximating distribution at the first location with a correction term to reproduce the rock physics probability distribution at the first location.

34. A method of determining a rock facies in a subterranean region of the Earth at a first location comprising the steps of:
obtaining seismic data associated with said region;
selecting a plurality of facies;
providing a first rock physics probability distribution with spatial dependencies;
approximating the first rock physics probability distribution around the first location with at least one distribution per combination of facies in a window comprising the first location and at least one further location, to obtain a simplified, second rock physics distribution;
performing a Bayesian inversion by a computer processor using the simplified, second rock physics probability distribution to predict the probability of the rock facies at said first location taking into account the seismic data, in order to indicate a presence of said facies in said region; and
correcting for deviations of the approximating distribution at the first location with a correction term to reproduce the rock physics probability distribution at the first location.

* * * * *